United States Patent [19]

Vora et al.

[11] Patent Number: 5,077,383
[45] Date of Patent: Dec. 31, 1991

[54] NOVEL HEXAFLUORO POLYBENZIMIDAZOLONE POLYMERS

[75] Inventors: Rohitkumar H. Vora, Westfield; Paul N. Chen, Sr., Gillette; Joseph D. Menczel, Passaic, all of N.J.

[73] Assignee: Hoechst Celanese Corp., Somerville, N.J.

[21] Appl. No.: 494,009

[22] Filed: Mar. 15, 1990

[51] Int. Cl.$^5$ ............... C08G 69/42; C08G 69/26; C08G 8/02; C08G 63/00
[52] U.S. Cl. .................... 528/353; 528/125; 528/128; 528/183; 528/186; 528/337; 528/341; 528/342; 528/344
[58] Field of Search ............... 528/341, 342, 337, 344, 528/183, 186, 125, 128, 353

[56] References Cited

U.S. PATENT DOCUMENTS

| | | | |
|---|---|---|---|
| 3,509,108 | 4/1970 | Prince | 528/342 |
| 3,686,149 | 8/1972 | Ohfuji | 528/342 |
| 4,312,976 | 1/1982 | Choe | 528/342 |

FOREIGN PATENT DOCUMENTS 527453  8/1977  U.S.S.R. ............... 528/342

*Primary Examiner*—John Kight, III
*Assistant Examiner*—T. Mosley
*Attorney, Agent, or Firm*—J. M. Hunter, Jr.

[57] ABSTRACT

New polybenzimidazolone polymers produced from the reaction of an aromatic tetraamine with a hexafluoro dianhydride. These hexafluoro polybenzimidazolone polymers based on an aromatic hexafluoro dianhydrides show improved solubility, easy processability, low moisture uptake, high thermal stability, resistance to solvent and other improvements over conventional polybenzimidazolone polymers.

1 Claim, No Drawings

NOVEL HEXAFLUORO POLYBENZIMIDAZOLONE POLYMERS

BACKGROUND OF INVENTION

1. Field of Invention

This invention relates to modified polybenzimidazolone polymers and a process for their production. More particularly this invention relates to hexafluoro polybenzimidazolone polymers.

2. Prior Art

Polybenzimidazoles are a group of nonflammable polymers which may be formed into fibers, films and membranes having outstanding thermal, physical and chemical stability. Processes for their production are disclosed, for example, in U.S. Re. 26,065 and U.S. Pat. Nos. 3,313,783, 3,509,108, 3,555,389, 3,433,772, 3,408,336, 3,549,603, 3,708,439, 4,154,919 and 4,312,976. (All patents mentioned herein are incorporated by reference).

Conventional polybenzimidazoles have been produced by the reaction of at least one aromatic tetraamine with a dicarboxylic acid, an ester of a dicarboxylic acid or a dicarboxylic acid halide. For example, in U.S. Pat. No. 2,895,948, polybenzimidazoles are prepared by the following condensation reaction:

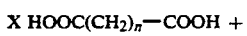

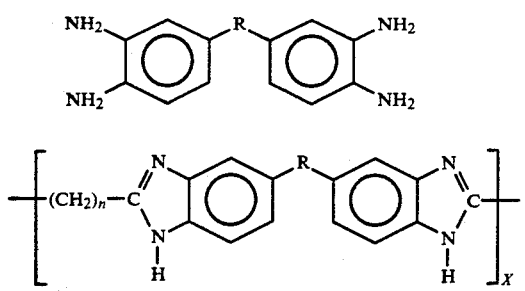

wherein R is a group of the class consisting of diphenyl bonds and divalent hydrocarbon radicals and n is from 4 to 8. For other conventional process for the production of polybenzimidazole polymers, see for example U.S. Pat. No. 4,814,530, 4,431,796 and 4,414,383.

While polybenzimidazole polymers produced by the methods disclosed above have been quite useful, they possess certain deficiencies in their processability, solubility, resistance to moisture absorption, tractability and flammability. One method of improving these characteristics has been the replacement of the imidazole hydrogen with less reactive substituents to produce N-substituted polybenzimidazole polymers. See for example U.S. Pat. No. 4,579,915, and 4,377,546.

Another method of improving the polybenzimidazole polymers is to prepare substituted polybenzimidazole polymers. For example, a vast array of substituted tetraamino heterocyclic compounds useful in the preparation of substituted polybenzimidazole polymers are disclosed in U.S. Pat. No. 3,943,125. Although many types of substituted tetraamino compounds are disclosed in the '125 patent, the use of a hexafluoro-substituted reactants to produce a substituted polybenzimidazolone compound is not disclosed.

Another method of improving the performance of polybenzimidazole polymers is to modify their structure, such as by producing polybenzimidazolone polymers. The original process for the production of polybenzimidazolone polymers was disclosed in Marvel, C. S., *Journal of Polymer Science, Part A.* (3), p. 3549 (1965). That article discloses the reaction of a biphenyl tetraamine with a biphenyl dianhydride to produce a polybenzimidazolone polymer. This process, however, does not disclose the hexafluoro polybenzimidazolone polymers of the instant invention. In addition, the polymers produced by the instant application have better stability, superior chemical and physical properties, lower moisture regain and enhanced processability over the prior art polymers.

U.S. Pat. No. 4,260,652 discloses a process for producing a permselective composite membrane wherein a significant number of imidazolone polymers are disclosed. See for example, column 33 through 44. The imidazolones disclosed may or may not have bridging members selected from the group consisting of

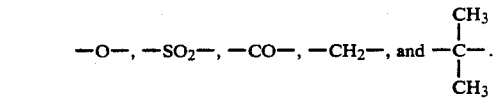

Although, there are a significant number of imidazolone polymers disclosed, none are polybenzimidazolones and none contain the hexafluoro subtituent present in the instant application, nor does the patent disclose the instant process.

U.S. Pat. No. 4,537,974 discloses a diethynylated phenylbenzimidazole compound having the formula:

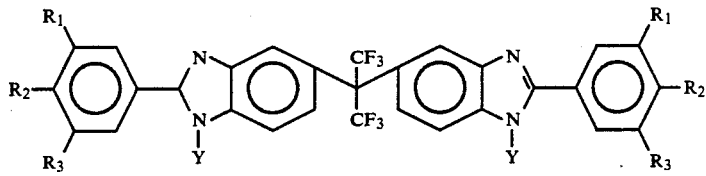

wherein Y is phenyl, cyclohexyl, adamantyl or phenoxylatedphenyl of the formula $C_6 H_5 (OC_6 H_4)n$ ($n=1$ to 3) and where $R_1$, $R_2$ and $R_3$ are ethynyl, phenoxyethynl, phenylethynyl, or hydrogen and further wherein at least one of said $R_1$, $R_2$ or $R_3$ is not hydrogen. This product is produced by the reaction of a hexafluoro substituted diaryl material with an aryl ethynyl material. While this reaction uses a hexafluoro material as a reactant, the hexafluoro material is significantly different from that used in the instant invention. In addition, the aryl ethynyl reactant is significantly different from the second reactant used in the instant process for the production of a substituted polybenzimidazolone polymers and the final product produced is also significantly different. See related U.S. Pat. No. 4,587,315.

A significant number of naphthoylene-based polybenzimidazoles which may or may not contain a hexafluoro substituent are disclosed in a number of chemical abstract articles. See for example, *Chemical Abstracts*, Vol. 96, 20, 96:862357c (1982); *Chemical Abstracts, Synthetic High Polymers*, Vol. 96, 5, 96:20530h (1982); *Chemical Abstracts, Synthetic High Polymers*, Vol. 92, 9 92:77055d (1980); *Chemical Abstracts, Heterocycles*, Vol. 92, 609, 92:6465b (1980); *Chemical Abstracts, Plastics Manuf.*, Vol. 90, 29, 90:169374u (1979); and *Chemical Abstracts, Plastic Manuf.*, Vol. 88, 31, 88:90478f (1978). While each of these Chemical Abstract articles disclose naphthoylene-based polybenzimidazoles wherein a possible substituent is a hexafluoro substituent, they fail to disclose the process of the instant invention, the types of hexafluoro compounds used in the instant process or the production of polybenzimidazolones.

U.S. Pat. No. 4,713,438 discloses a process for the production of certain polyimides containing CF3 radicals within their structure. However, it fails to show the polybenzimidazolone polymers of the instant invention or suggest the use of 6F monomers for the preparation of polybenzimidazolone polymers.

Accordingly it is an object of the present invention to prepare novel hexafluoro polybenzimidazolone polymers.

It is a further object of this invention to prepare novel polybenzimidazolone polymers using hexafluoro dianhydrides as a reactant.

It is a further object of this invention to prepare novel polybenzimidazolone polymers using hexafluoro dianhydrides as a reactant that exhibit increased solubility over conventional polybenzimidazole polymers.

It is a still further object of this invention to prepare novel polybenzimidazolone polymers using hexafluoro dianhydrides as a reactant which exhibit increased low temperature processibility over conventional polybenzimidazole polymers.

It is a still further object of this invention to prepare novel polybenzimidazolone polymers using hexafluoro dianhydrides as a reactant which exhibit low moisture absorption, low flammability and long term thermal stability.

It is a still further object of this invention to prepare novel polybenzimidazolone polymers using hexafluoro dianhydrides as a reactant which exhibit increased solvent resistance.

It is an additional object of this invention to prepare novel polybenzimidazolone polymers using hexafluoro dianhydrides as a reactant which can be easily blended with other polymers to form useful composites.

These and other objects, as well as the scope, nature and utilization of the product will be apparent to those skilled in the art from the following description and appended claims.

SUMMARY OF INVENTION

One or more objects of the present invention is accomplished by the preparation of a polymeric composition which is characterized by the recurring monomeric unit:

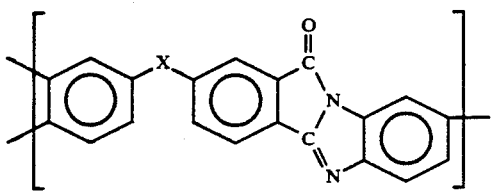

where x represents

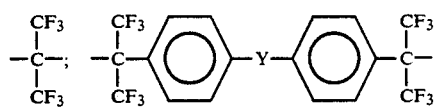

wherein Y represents —O—, —S—, SO2, or a lower alkyl group such as $(CH_2)_n$ wherein $n=1$ to 10, $-(CF_2)_n$ wherein $n=1$ to 10,

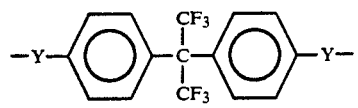

wherein Y is defined above; and

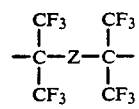

wherein Z represents

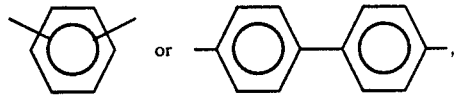

In addition, the hydrogen of the phenyl groups can be substituted with substituents such as Cl, F, Br, CH3, CF3, NH2, NO2, OH and the like.

Another object of the present invention is the disclosure of a process for the production of aromatic hexafluoro polybenzimidazolone polymers prepared by condensing an aromatic tetraamine compound with a hexafluoro dianhydride.

The hexafluoro polybenzimidazolone polymers based on hexafluoro anhydrides produced by the process of this invention can be formed into a wide range of products which show improved solubility, low temperature processibility, low moisture aborption, high thermal stability, resistance to solvents after curing, excellent mechanical properties, easy blending with other polymers, low dielectric constants, excellent electric properties and high temperature surface applications when compared to conventional polybenzimidazolone polymers. In particular, these products may have significant use in the aerospace, composite and electronic industries. Also these polymers would have excellent gas separation properties which would make them very useful as materials for the preparation/fabrication of gas separation membranes of various kinds.

DETAILED DESCRIPTION OF INVENTION

The starting material is any aromatic tetraamine compound containing a pair of orthodiamino substituents on a biphenyl aromatic nucleus with the preferred tetraamine compound being 3,3',4,4' tetraamino biphenyl (hereinafter referenced to as the aromatic "tetraamine". This tetraamine is available from Hoechst Celanese Corporation). Its structure is as follows:

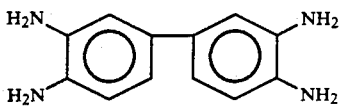

Reacted with this aromatic tetraamine material is a hexafluoro dianhydride of an aromatic carboxylic acid or a combination of hexafluoro dianhydrides with non-hexafluoro dianhydrides of aromatic carboxylic acids wherein the acceptable carboxylic acids include aromatic tetracarboxylic acids; aliphatic tetracarboxylic acids (preferably, those having 4 to 8 carbon atoms); and heterocyclic tetracarboxylic acids wherein the carboxyl groups are substituents upon carbon atoms in a ring compound such as pyridine, pyrazine, furan, quinoline, thiophene, and pyran.

The non hexafluoro dianhydrides available commercially are represented by the structure.

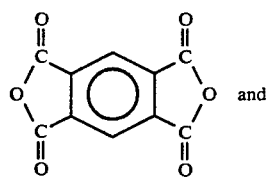

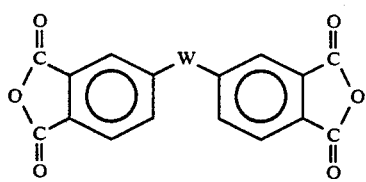

where W = a single bond, —O—, —S—,

—(CH$_2$)$_n$, (CF$_2$)$_n$, where n = 1 to 10,

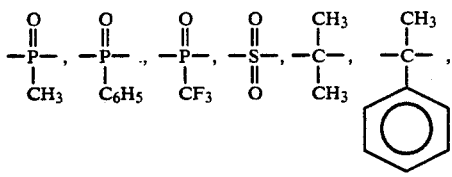

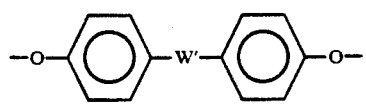

wherein W' represents —O—, —S—, —(CH$_2$)$_n$, —(CF$_2$)$_n$ wherein n = 1 to 10,

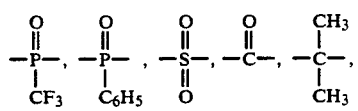

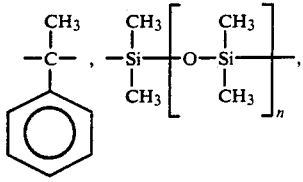

where n = 1 to 4.

The preferred hexafluoro dianhydrides are aromatic hexafluoro dianhydrides such as those illustrated below:

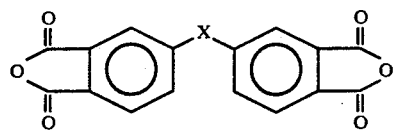

where X represents

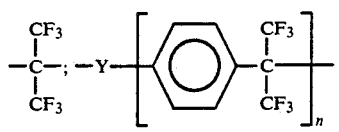

wherein n = 1–10 and wherein Y represents

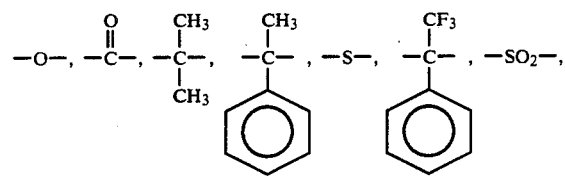

a lower alkyl group such as (CH$_2$)$_n$ wherein n = 1 to 10; or (CF$_2$)$_n$ wherein n = 1 to 10,

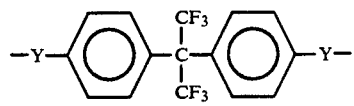

wherein Y is defined above;

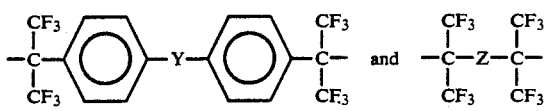

wherein Z represents

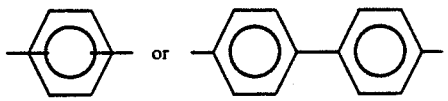

and where Y is defined above.

In addition, any of hydrogens on the phenyl groups can be substituted with substituents such as Cl, F, Br, CH$_3$, NH$_2$, OH and the like. The preferred hexafluoro dianhydride is 2,2' bis(3,4-dicarboxy phenyl) hexafluoro propane dianhydride [6FDA] electronic grade available from Hoechst Celanese Corporation. Electronic grade 6FDA contains less than 10 ppm of sodium, less than 5 ppm of iron, less than 2 ppm of cobalt, less than 2 ppm of manganese and has a melting point of 247° C.

The following generalized equation illustrates the condensation reaction which occurs in forming the hexafluoro polybenzimidazolone polymer:

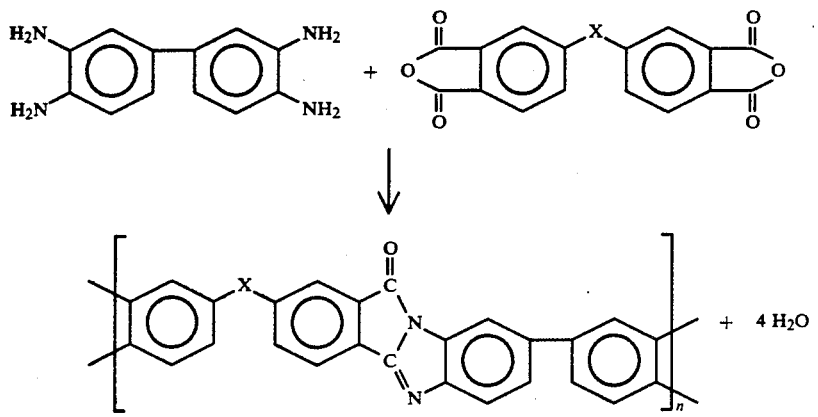

wherein X is as previously defined.

The particularly preferred hexafluoro polybenzimidazolone polymer prepared by the process of the present invention is as characterized by the recurring unit:

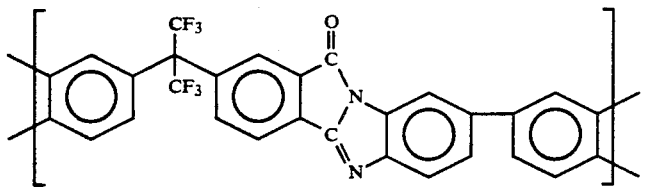

The illustrated polymer can be prepared in accordance with the present invention process by the reaction of 3,3',4,4' tetraamino biphenyl with 2,2'bis (3,4 dicarboxy phenyl) hexafluoro propane dianhydride.

Any conventional process known to those skilled in the art may be employed to prepare the polybenzimidazolone polymer based on hexafluoro dianhydrides. It is preferred to employ the hexafluoro dianhydride or combination of hexafluoro and non-hexafluoro dianhydride at a ratio at least 1 mole per mole of the aromatic tetraamine. However, in order to obtain a product having an optimum viscosity, it is advantageous to employ up to an excess (0.25 mole percent) of the dianhydride to the aromatic tetraamine reactant. The appropriate quantities of the aromatic tetraamine and the dianhydride compound are introduced into the reaction zone and heated therein at a temperature above about 200° C. preferably from about 200° C. to about 320° C. The reaction is conducted in a substantially oxygen free atmosphere, i.e., below about 20 ppm oxygen and preferably below about 8 ppm oxygen. Usually the first stage of reaction is continued until a prepolymer is formed having an inherent viscosity, of at least about 0.05 dl/g (determined from a solution of 0.4 grams of the polymer in 100 milliliters of 97 percent $H_2SO_4$ at 25° C.). During this first stage heating process preferably, the reactants are agitated by conventional agitation procedures.

After the conclusion of the first stage reaction, which normally takes about 0.5 hours to about 3 hours and preferably about from about 1 to 3 hours, the prepolymer product is cooled and pulverized. The prepolymer is then introduced into a second stage polymerization reaction zone where it is heated under substantially oxygen free conditions to yield the hexafluoro polybenzimidazolone polymer using the aromatic hexafluoro dianhydride product as a reactant, desirably with an inherent viscosity of at least about 0.08 dl/g.

The temperature employed in the second stage is of at least about 250° C. and preferably from about 275° C. to about 450° C. The second stage reaction generally takes at least about 0.5 hours and preferably about 3.0 hours or more. (The polymer may also be produced by a one step reaction although the previously described two step process is preferred.)

The following example is given as a specific illustration of the invention. All parts and percentages are by weight unless otherwise stated. It is understood however, that the invention is not limited specific details set forth in the examples.

EXAMPLE 1

Into a three necked flask equipped with a nitrogen inlet and outlet, a mechanical stirrer, a Dean Stark trap, thermometer, thermal/watch/timer, heating mantle and a condenser were placed 10.92 gm of 3,3',4,4' tetraamino biphenyl [TAB] and 22.2 gms of 2,2' bis(3,4-dicarboxy phenyl) hexafluoro propane dianhydride [6FDA] electronic grade, available from Hoechst Celanese Corporation. The flask was degassed and then filled with nitrogen. The degassing was repeated three times. The mixture was heated rapidly with stirring to 320° C. for 2 hours. The resulting product was then cooled to room temperature and then ground.

The ground prepolymer was placed in a flask and after degassing was repeated, the prepolymer was heated at 350° C. for 2 hours. The resulting hexafluoro polybenzimidazolone exhibited an inherent viscosity of 0.08 dl/gm when measured at a concentration of 0.4 g of the hexafluoro polybenzimidazolone in 100 ml of 97 percent sulfuric acid at 25° C. The polymer has a 5% weight loss measured at 500° C. determined by thermogravemetric analysis (TGA) using a DuPont 951 connected to a DuPont 1090 thermal analyser at a heating rate of 20° C./min using air as a purge gas with a flow rate at 40° C./min.

EXAMPLE 2

Into a three necked flask equipped with a nitrogen inlet and outlet, a heating mantle, thermometer, addition funnel, mechanical stirrer, Dean Stark trap, thermal/watch/timer and a condenser were placed 4.60 g of 2,2'-bis (3,4 diaminophenyl) hexafluoro propane and 5.55 gm of 2,2' bis(3,4-dicarboxy phenyl) hexafluoro propane dianhydride [6FDA] electronic grade, available from Hoechst Celanese Corporation. The flask was degassed and then filled with nitrogen. The degassing was repeated at least three times. The mixture was heated rapidly with stirring to 320° C. for 2 hours. The resulting product was then cooled to room temperature and then ground.

The ground prepolymer was placed in a flask and after degassing was repeated, the prepolymer was heated at 350° C. for 2 hours. The resulting hexafluoro polybenzimidazolone exhibited an inherent viscosity of 0.21 dl/gm when measured at a concentration of 0.5 g of the hexafluoro polybenzimidazolone in 100 ml of N-methyl pyrollidone at 25° C. The polymer has a 5% weight loss measured at 500° C. determined by thermogravemetric analysis (TGA) using a DuPont 951 connected to a DuPont 1090 thermal analyser at a heating rate of 20° C./min using air as a purge gas with a flow rate at 40° C./min.

We claim:

1. A polymeric composition having recurring units of the formula

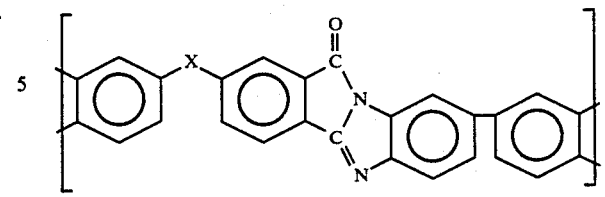

where X is selected from the group consisting of

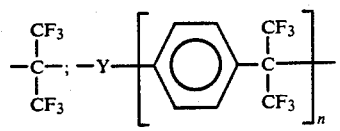

wherein n=1-10 and wherein Y is selected from the group consisting of

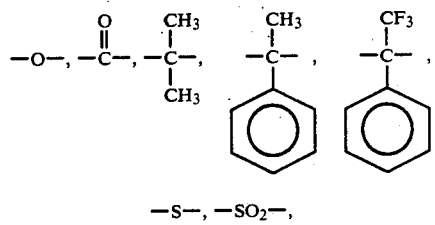

a lower alkyl group; or $-(CF_2)_n$ wherein n=1 to 10,

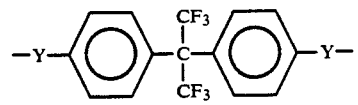

wherein Y is defined above;

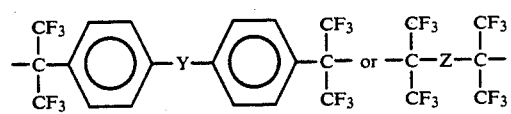

wherein Z is selected from the group consisting of

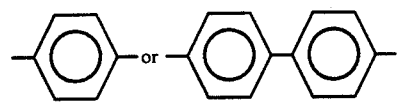

and where Y is defined above.

* * * * *

UNITED STATES PATENT AND TRADEMARK OFFICE
CERTIFICATE OF CORRECTION

PATENT NO. : 5,077,383
DATED : December 31, 1991
INVENTOR(S) : R. H. Vora et al

It is certified that error appears in the above-indentified patent and that said Letters Patent is hereby corrected as shown below:

On the title page: Item [75] change "Passaic" to-- West Paterson --.

Column 9, line 51, change "40°C./min." to 40 CC/min --.

Signed and Sealed this

First Day of March, 1994

Attest:

BRUCE LEHMAN

Attesting Officer           Commissioner of Patents and Trademarks